US009294759B2

(12) United States Patent
Hirai

(10) Patent No.: US 9,294,759 B2
(45) Date of Patent: Mar. 22, 2016

(54) DISPLAY DEVICE, METHOD AND PROGRAM CAPABLE OF PROVIDING A HIGH-QUALITY STEREOSCOPIC (3D) IMAGE, INDEPENDENTLY OF THE EYE-POINT LOCATION OF THE VIEWER

(71) Applicant: Sony Corporation, Tokyo (JP)

(72) Inventor: Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 561 days.

(21) Appl. No.: 13/681,449

(22) Filed: Nov. 20, 2012

(65) Prior Publication Data

US 2013/0147930 A1 Jun. 13, 2013

(30) Foreign Application Priority Data

Dec. 7, 2011 (JP) .................................. 2011-267558

(51) Int. Cl.
*H04N 13/04* (2006.01)
*H04N 13/02* (2006.01)

(52) U.S. Cl.
CPC ........... *H04N 13/04* (2013.01); *H04N 13/0271* (2013.01); *H04N 13/0409* (2013.01); *H04N 13/0411* (2013.01); *H04N 13/0484* (2013.01)

(58) Field of Classification Search
CPC .................................................. H04N 13/0409
USPC .............. 348/51–54; 345/697, 419, 156, 426; 351/201
See application file for complete search history.

(56) References Cited

U.S. PATENT DOCUMENTS

| 5,825,456 | A  | * | 10/1998 | Tabata et al. ................... 351/201 |
| 6,005,607 | A  | * | 12/1999 | Uomori et al. ................... 348/42 |
| 8,970,478 | B2 | * | 3/2015  | Johansson ...................... 345/156 |
| 2008/0068372 | A1 | * | 3/2008 | Krah .................. H04N 13/0402 345/419 |
| 2012/0032952 | A1 | * | 2/2012 | Lee et al. ....................... 345/419 |
| 2012/0056872 | A1 | * | 3/2012 | Kim et al. ...................... 345/419 |
| 2012/0154378 | A1 | * | 6/2012 | Kitchens ........................ 345/419 |
| 2013/0169529 | A1 | * | 7/2013 | Ek .................................. 345/156 |
| 2013/0187961 | A1 | * | 7/2013 | Hunt ............................. 345/697 |
| 2013/0307939 | A1 | * | 11/2013 | May et al. ........................ 348/49 |

FOREIGN PATENT DOCUMENTS

| JP | 10-078562 A | 3/1998 |
| JP | 10-333091 A | 12/1998 |

* cited by examiner

*Primary Examiner* — Paulos M Natnael

(74) *Attorney, Agent, or Firm* — Wolf, Greenfield & Sacks, P.C.

(57) ABSTRACT

A display device according includes: a display section which displays a plurality of images intended for different eye-points; a separation section which optically separates the plurality of images for the different eye-points; a travel distance calculation section which calculates a plurality of directional travel distances of the separation section relative to the display section, in accordance with a change in an eye-point location of a viewer observing the display section; and a plurality of drive sections which is driven on the basis of the directional travel distances and moves the separation section relative to the display section.

6 Claims, 11 Drawing Sheets

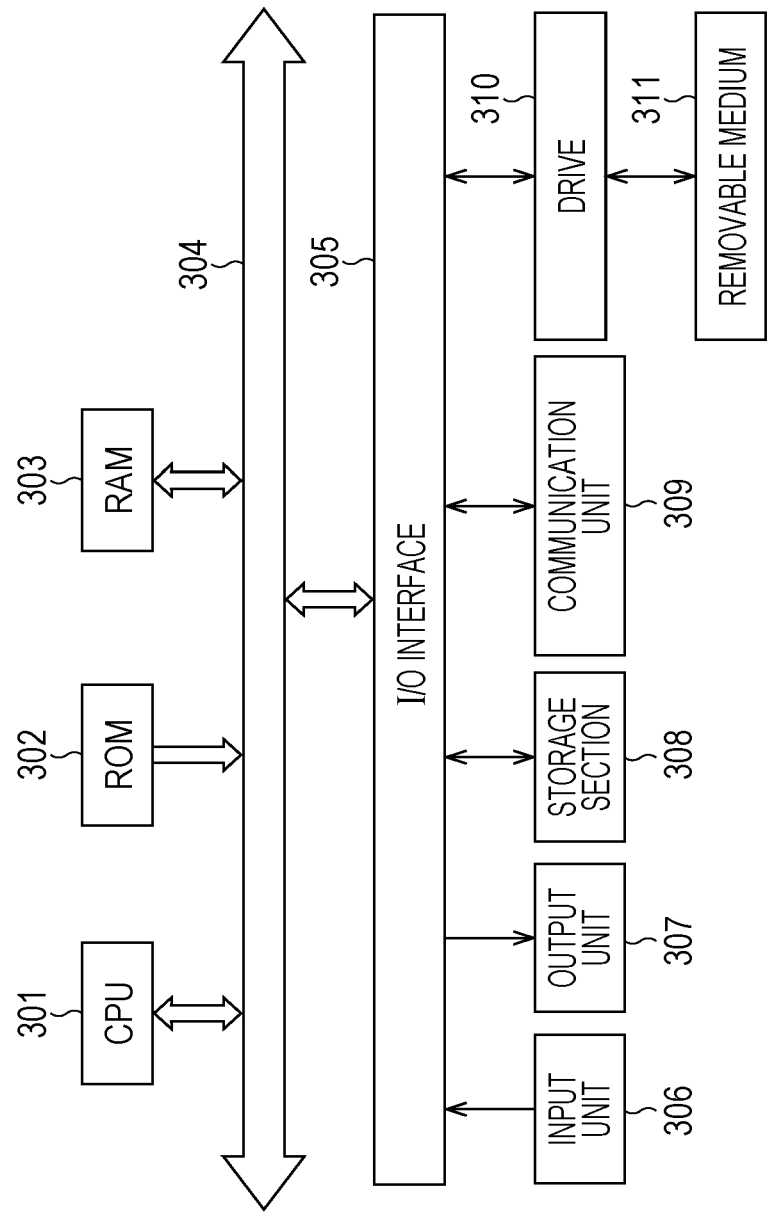

DISPLAY DEVICE, METHOD AND PROGRAM CAPABLE OF PROVIDING A HIGH-QUALITY STEREOSCOPIC (3D) IMAGE, INDEPENDENTLY OF THE EYE-POINT LOCATION OF THE VIEWER

BACKGROUND

The present technology relates to a display device, a display method, and a display program, and in particular, to a display device, a display method, and a display program which are capable of providing a high-quality stereoscopic (3D) image, independently of the eye-point location of the viewer.

Currently, there are display devices which display a 3D image composed of images intended for right and left eyes. Techniques for displaying such a 3D image are mainly classified into two types: one is a glasses-type technique that involves wearing dedicated glasses; and the other is a glasses-free-type technique that allows the viewer to observe the image with the naked eye.

For example, the above glasses-free-type technique optically separates the images for right and left eyes on the display device by using a barrier or some other suitable optical component. Then, the viewer observes these images with his or her right and left eyes, respectively. In relation to this technique, a technique (referred to as a "first technique") has been proposed which uses a barrier formed of liquid crystal; detects the location of a viewer's face or eye-points; and changes the location of the barrier formation in accordance with the detection result (for example, refer to Japanese Unexamined Patent Application Publication No. 10-333091). Furthermore, a technique (referred to as a "second technique") has also been proposed which moves a 3D region by displacing a lenticular lens on the basis of the location of a viewer's head (for example, refer to Japanese Unexamined Patent Application Publication No. 10-078562).

SUMMARY

Unfortunately, the first technique has difficulty providing a high-quality 3D image.

In more detail, the technique for changing the location of the barrier formation is simply to select the location of the barrier from among multiple location candidates. Accordingly, it is difficult to continuously move the location of the barrier in accordance with the location of the viewer's face. As a result, the barrier may not be positioned where crosstalk is minimal for the location of the viewer's face, and consequently, the first technique fails to provide a high-quality 3D image.

Moreover, in a display device equipped with the first technique, it is necessary to design the barrier and some relevant optical elements precisely, in order to prevent the luminance of the 3D image from varying depending on the viewing angle of the viewer. If the design is not precise, the luminance of the 3D image may vary with the change in the location of the barrier. In addition, because the liquid crystal in the barrier has a low light transmittance, the luminance of the 3D image may decrease.

Meanwhile, the second technique is configured to improve the quality reduction in the 3D image which is caused with the movement of the viewer's eye-points as described above, when employing the stripe barrier structure. However, in the case where the viewer and the displayed image are separated by a predetermined distance or longer, it becomes difficult to provide a sufficiently high-quality 3D image. Furthermore, when the second technique employs the step or delta barrier structure for the purpose of acquiring the balance between the lateral and vertical resolutions, it is difficult to suppress the quality reduction in the 3D image when the viewer's eye-points move vertically.

It is desirable to provide a display device, a display method, and a display program which are capable of providing a high-quality 3D image, regardless of barrier structure and independently of the eye-point location of the viewer.

A display device according to an embodiment of the present technology includes: a display section which displays a plurality of images intended for different eye-points; a separation section which optically separates the plurality of images intended for the different eye-points; a travel distance calculation section which calculates a plurality of directional travel distances of the separation section relative to the display section, in accordance with a change in an eye-point location of a viewer observing the display section; and a plurality of drive sections which are driven on the basis of the directional travel distances and moves the separation section relative to the display section.

It is preferable for the drive sections to move the separation section in a direction perpendicular to a display surface of the display section.

It is preferable for the travel distance calculation section to calculate a travel distance of the separation section in the direction perpendicular to the display surface, on the basis of a distance between the separation section and the viewer's eye-point location, a viewer's eye interval, and a pitch between each adjacent pair of pixels provided in the display section.

It is preferable for the drive sections to move the separation section in a plurality of directions parallel to the display surface of the display section.

It is preferable for the travel distance calculation section to calculate a plurality of travel distances of the separation section in respective directions parallel to the display surface, on the basis of changing amounts of the viewer's eye-point location in the directions parallel to the display surface, a distance between the separation section and the display section, and a distance between the separation section and the viewer's eye-point location.

It is preferable for the display device to include a first holding member which holds the separation section, and a second holding member which holds the first holding member. In addition, it is preferable for the drive section to be provided between the first holding member and the second holding member and to move the separation section by displacing the first holding member relative to the second holding member.

A display method or a process of a display program according to an embodiment of the present technology is performed by a display device including: a display section which displays a plurality of images intended for different eye-points; a separation section which optically separates the images intended for the different eye-points; and a drive section which moves the separation section relative to the display section in a plurality of directions. The display method and the process of the display program both include: calculating a plurality of directional travel distances of the separation section relative to the display section, in accordance with a change in an eye-point location of a viewer observing the display section; and driving the drive section on the basis of the directional travel distances and moving the separation section relative to the display section.

A display device according to an embodiment of the present technology includes: a display section which displays a plurality of images intended for different eye-points; a separation section which optically separates the plurality of images intended for the different eye-points; and a drive section which moves the separation section relative to the display section in a plurality of directions. The display device is configured to calculate a plurality of directional travel distances of the separation section relative to the display section, in accordance with a change in an eye-point location of a viewer observing the display section, and to move the separation section relative to the display section by driving the drive section on the basis of the directional travel distances.

BRIEF DESCRIPTION OF THE DRAWINGS

FIG. 11 is a view illustrating an exemplary configuration of a computer that performs the processes.

DETAILED DESCRIPTION OF EMBODIMENTS

Hereinafter, a description will be given of embodiments of the present technology with reference to the accompanying drawings.

First Embodiment

Exemplary Configuration of Appearance of Display Device

Figure 1:
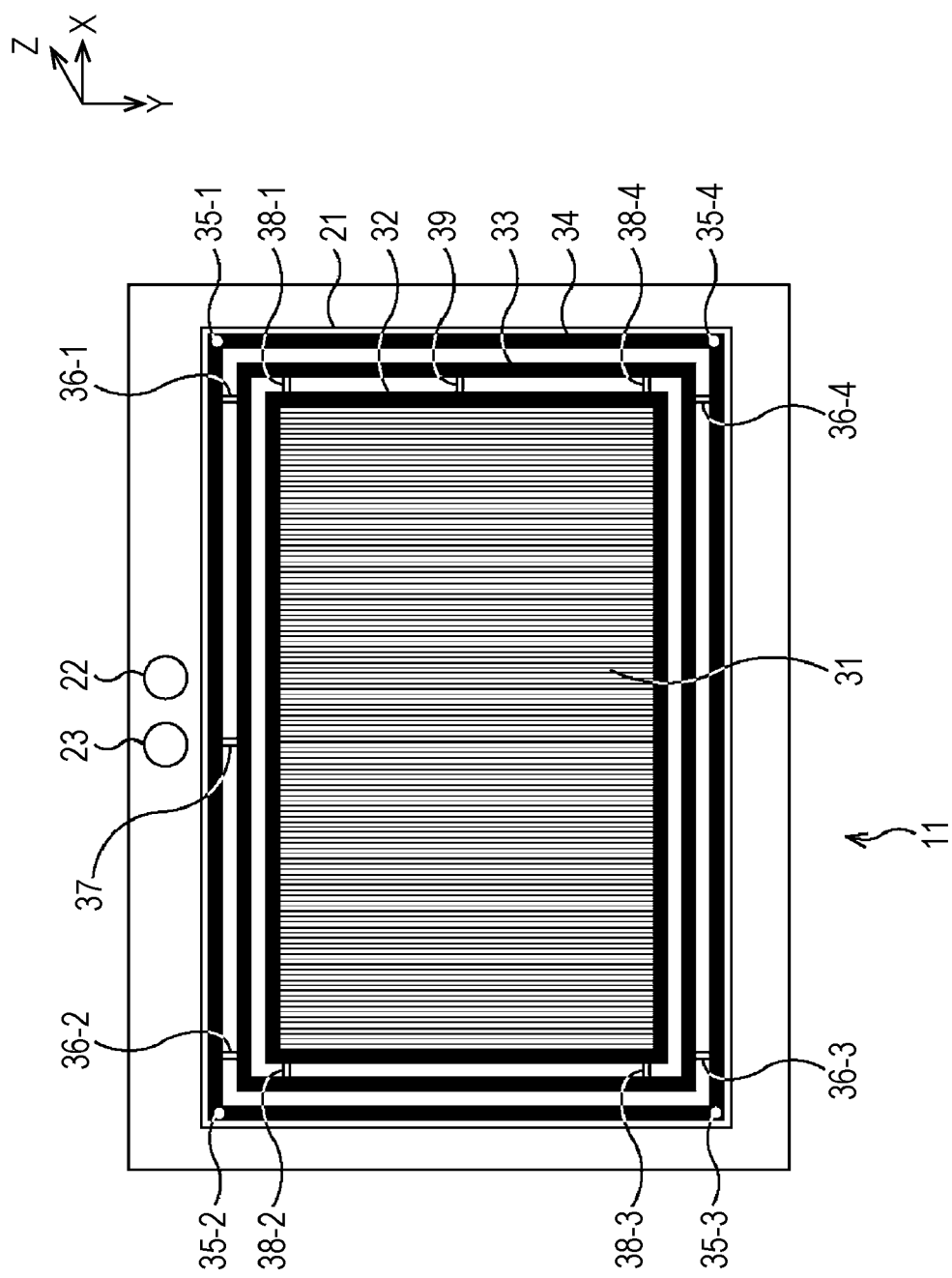
FIG. 1 is a view illustrating an exemplary configuration of an appearance of a display device according to a first embodiment of the present technology.

FIG. 1 is a view illustrating an exemplary configuration of an appearance of a display device according to a first embodiment of the present technology.

A display device 11 illustrated in FIG. 1 is configured to display a 3D image composed of images intended for right and left eyes which have a parallax therebetween, and it may be implemented by a liquid crystal or some other display. A housing of the display device 11 is provided with a display section 21 that displays a 3D image, an illumination section 22 that shines illumination light on a viewer, and an image pickup section 23 that captures an image of the viewer.

The 3D image on the display device 11 is not limited to a 3D image for two eye-points which is composed of two images intended for different eye-points. Alternatively, the 3D image may be a 3D image for multiple eye-points which is composed of two or more images intended for different eye-points. In the case where a 3D image for multiple eye-points is displayed, the display of the 3D image is controlled in such a way that two of the images intended for different eye points are observed by the viewer's right and left eyes, respectively. Hereinafter, a description will be given regarding the case where the display device 11 displays a 3D image for two eye-points.

The display section 21 is provided with a barrier element 31 that optically separates images for right and left eyes on a light modulation panel (not illustrated). This barrier element 31 is constituted by a parallax barrier including light-shielding portions that block light incident from the light modulation panel, and opening portions that allow the light incident therefrom to pass therethrough.

Upon displaying a 3D image, the viewer observes images for right and left eyes on the light modulation panel through the opening portions of the barrier element 31. Specifically, the light emitted from the light modulation panel is split into light beams for displaying images for right and left eyes, respectively. Then, the respective split light beams reach the viewer's right and left eyes through the barrier element 31.

The display section 21 is provided with an X frame 32, a Y frame 33, and a Z frame 34 that move the barrier element 31 in lateral, vertical and depth directions, respectively, as seen in FIG. 1, with respect to the housing of the display device 11. The barrier element 31 is fixed to the inner side of the X frame 32. Hereinafter, in FIG. 1, the lateral, vertical and depth directions are referred to as "X, Y and Z directions", respectively.

The above X direction corresponds to a direction in which a parallax is generated between the images for right and left eyes, or a direction with which his or her right and left eyes are aligned when a viewer observes the 3D image. In addition, the X and Y directions are parallel to the display surface of the display device 11, whereas the Z direction is vertical thereto.

The Z frame 34 is connected to the housing of the display device 11 through Z drive sections 35-1 to 35-4 provided at the respective four corners of the rectangular Z frame 34. The Z drive sections 35-1 to 35-4, each of which is implemented by, for example, an ultrasound actuator, move the barrier element 31 in the Z direction by displacing the Z frame 34 in the Z direction with respect to the housing of the display device 11.

Note that each of the Z drive sections 35-1 to 35-4 will also be called simply a "Z drive section 35" hereinafter when it is not necessary to distinguish them individually.

The rectangular Y frame 33 is fixed to the inner side of the Z frame 34 through extendable guide rods 36-1 to 36-4 provided on the inner upper and lower sides, as seen in FIG. 1, of the Z frame 34. A Y drive section 37, which is implemented by, for example, an ultrasound actuator, is provided between the Z frame 34 and the Y frame 33, and moves the barrier element 31 in the Y direction by displacing the Y frame 33 in the Y direction with respect to the Z frame 34.

Note that each of the guide rods 36-1 to 36-4 will also be called simply a "guide rod 36" hereinafter when it is not necessary to distinguish them individually.

The rectangular X frame 32 is fixed to the inner side of the Y frame 33 through extendable guide rods 38-1 to 38-4 provided on the inner right and left sides, as seen in FIG. 1, of the Y frame 33. An X drive section 39, which is implemented by, for example, an ultrasound actuator, is provided between the Y frame 33 and the X frame 32, and moves the barrier element 31 in the X direction by displacing the X frame 32 in the X direction with respect to the Y frame 33.

Note that each of the guide rods 38-1 to 38-4 will also be called simply a "guide rod 38" hereinafter when it is not necessary to distinguish them individually.

While the X drive section 39, the Y drive section 37, and the Z drive section 35 are not being driven, all the frames are maintained in place by means of frictional forces generated by the respective drive mechanisms in the X drive section 39, the Y drive section 37, and the Z drive section 35, so as not to move in corresponding directions. Note that in the case where the X frame 32, the Y frame 33 and Z frame 34 do not have a sufficient retention force in the Y direction, or against the gravity, they may be pulled upward, as seen in FIG. 1, against gravity by using springs or some other reinforcing members.

In the display device 11, the barrier element 31 moves in the X, Y and Z directions in accordance with so-called eye tracking. Specifically, upon displaying a 3D image, the illumination section 22 emits an illumination light toward the viewer, and the image pickup section 23 captures an image of the viewer.

Then, the display device 11 calculates respective travel distances of the location of the viewer's eye-point in the X, Y and Z directions, on the basis of the image acquired by the image pickup section 23. Following this, the display device 11 drives the X drive section 39, the Y drive section 37, and the Z drive section 35 on the basis of the calculation result, so that the barrier element 31 moves.

The reason why the illumination section 22 shines illumination light on the viewer is to facilitate the detection of the viewer in the image acquired by the image pickup section 23 during the eye tracking. Accordingly, it is desirable that the illumination light emitted from the illumination section 22 be light with a specific wavelength, such as near-infrared rays, because human skin absorbs a lot of near-infrared rays. Therefore, with near-infrared rays used as the illumination light and the image pickup section 23 configured to receive near-infrared rays reflected by the subject, it is possible to easily discriminate between the region of the human face in the acquired image and another area therein by capturing an image of the surrounding area of the display device 11.

(Exemplary Functional Configuration of Display Device)

Figure 2:
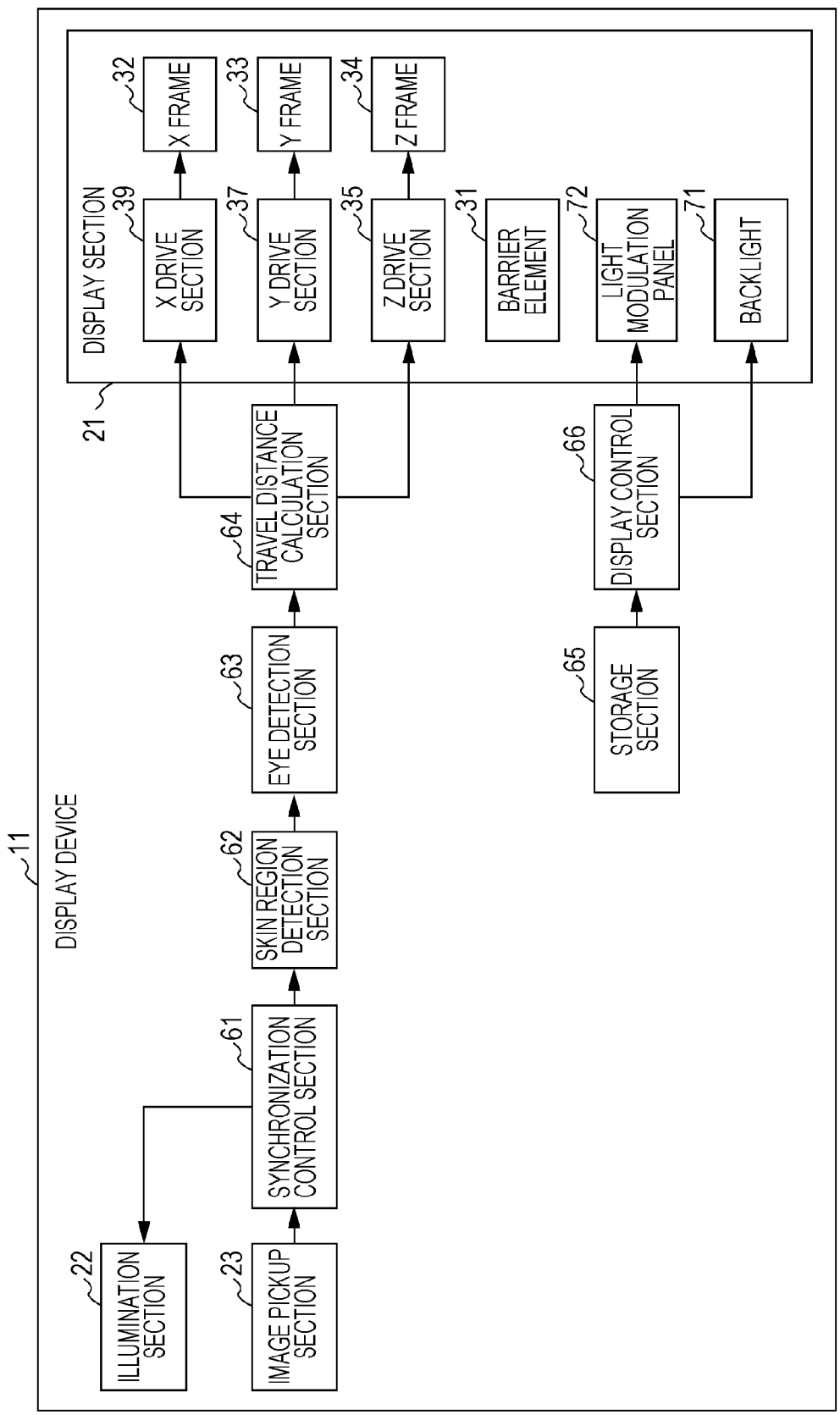
FIG. 2 is a functional block diagram of the exemplary configuration of the display device.

Next, a description will be given of a functional configuration of the display device 11. The display device 11 may have a configuration, such as that illustrated in FIG. 2. FIG. 2 is a functional block diagram of an exemplary configuration of the display device 11. Note that in FIG. 2, portions corresponding to those in FIG. 1 are given the same reference numerals, and a detailed description thereof will be omitted as appropriate.

The display device 11 illustrated in FIG. 2 includes the display section 21, the illumination section 22, the image pickup section 23, a synchronization control section 61, a skin region detection section 62, an eye detection section 63, a travel distance calculation section 64, a storage section 65, and a display control section 66.

The illumination section 22 emits illumination light with a specific wavelength, such as near-infrared rays, thereby shining the light on the viewer observing an image on the display section 21 of the display device 11. The image pickup section 23, which is implemented by, for example, a near-infrared camera, captures an image of the viewer observing the displayed image as a subject, and supplies the resultant captured image to the skin region detection section 62 through the synchronization control section 61.

The synchronization control section 61 causes the illumination section 22 to emit illumination light in synchronization with the capturing of the image by the image pickup section 23, and supplies the captured image from the image pickup section 23 to the skin region detection section 62. The skin region detection section 62 detects the region of the skin of the viewer (referred to as a "skin region" hereinafter) in the captured image supplied from the synchronization control section 61, and supplies the detection result to the eye detection section 63.

The eye detection section 63 calculates the location of the viewer's eyes within an XYZ coordinates space defined by axes extending in the X, Y and Z directions, on the basis of the detection result of the skin region in the captured image supplied from the skin region detection section 62. Then, the eye detection section 63 supplies the calculation result to the travel distance calculation section 64. Note that the location of the viewer's eye-points within the XYZ coordinates space, which is calculated by the eye detection section 63, will also be referred to as "eye-point location" hereinafter.

The travel distance calculation section 64 calculates a travel distance by which the barrier element 31 will move, on the basis of the eye-point location supplied from the eye detection section 63. Then, the travel distance calculation section 64 controls the movement of the barrier element 31 in the display section 21, on the basis of the calculated travel distance. The storage section 65 stores a 3D image that is a reproduction content, and supplies the 3D image to the display control section 66 as necessary. The display control section 66 controls the display section 21 on the basis of the 3D image supplied from the storage section 65, thereby displaying the 3D image on the display section 21.

The display section 21 includes a backlight 71, a light modulation panel 72, the barrier element 31, the Z drive section 35, the Y drive section 37, the X drive section 39, the X frame 32, the Y frame 33, and the Z frame 34.

The backlight 71 emits light for displaying a 3D image under the control of the display control section 66. The emitted light enters the light modulation panel 72. The light modulation panel 72 partially changes its transmittance for the light incident from the backlight 71 under the control of the display control section 66, thereby displaying images for right and left eyes composing a 3D image. When the light enters the light modulation panel 72 from the backlight 71, only the amount of light corresponding to the light transmittance of the light modulation panel 72 passes through the light modulation panel 72 and, then enters the barrier element 31.

The barrier element 31 blocks part of the light incident from the light modulation panel 72, but allows the remaining part of the light to pass therethrough, thereby optically separating images for right and left eyes. This enables the viewer to perceive the 3D image.

The X drive section 39, the Y drive section 37, and the Z drive section 35 move the X frame 32, the Y frame 33, and the Z frame 34, respectively, under the control of the travel distance calculation section 64.

(Barrier Element)

In the above display device 11, the barrier element 31 may employ various barrier element structures, including step, delta, and stripe barrier structures.

Figure 3:
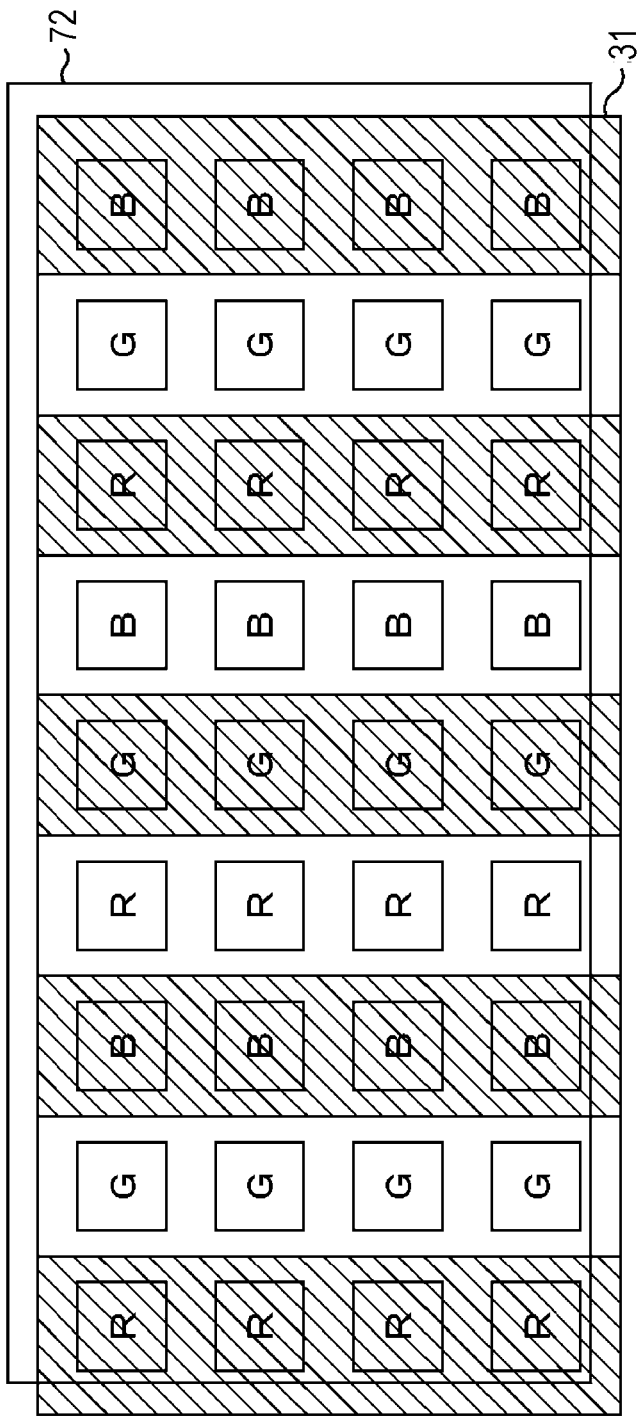
FIG. 3 is an explanatory view illustrating a strip barrier.

To give an example, when the barrier element 31 employs the stripe barrier structure, it has rectangular opening portions and light-shielding portions arranged alternately along the X direction, as illustrated in FIG. 3. Note that in FIG. 3, the lateral, vertical and depth directions represent the X, Y and Z directions, respectively.

In the example of FIG. 3, the barrier element 31 is provided in front of the light modulation panel 72 having R, G and B pixels, as seen in FIG. 3. Note that each square in the light modulation panel 72 represents a single pixel, and the letter "R", "G" or "B" in each pixel represents the color of the emitted light. For example, when incident light enters a pixel labeled with a letter "R", this pixel allows only a red component contained in the light to pass therethrough.

In the barrier element 31, each shaded portion represents a light-shielding portion, whereas each non-shaded portion represents an opening portion. Specifically, in the barrier element 31, the opening portions and the light-shielding portions whose respective longer sides extend along the Y direction are arranged alternately along the X direction.

FIG. 3 illustrates the barrier element 31 that is viewed by the viewer's right eye. In this example, through one opening portion, a single row of pixels arrayed in the Y direction is visible to the viewer's right eye, but the adjacent rows on the right and left sides thereof are not visible to the viewer's right eye. In contrast, the pixels covered by the light-shielding portions are not visible to the right eye, but are visible to the left eye.

In the light modulation panel 72 having the above stripe barrier structure, each row of pixels arrayed in the Y direction is viewed by the viewer with the same eye of the viewer. Therefore, even when the eye-point location of the viewer moves in the Y direction, it is not necessary for the barrier element 31 to move in the Y direction.

Figure 4:
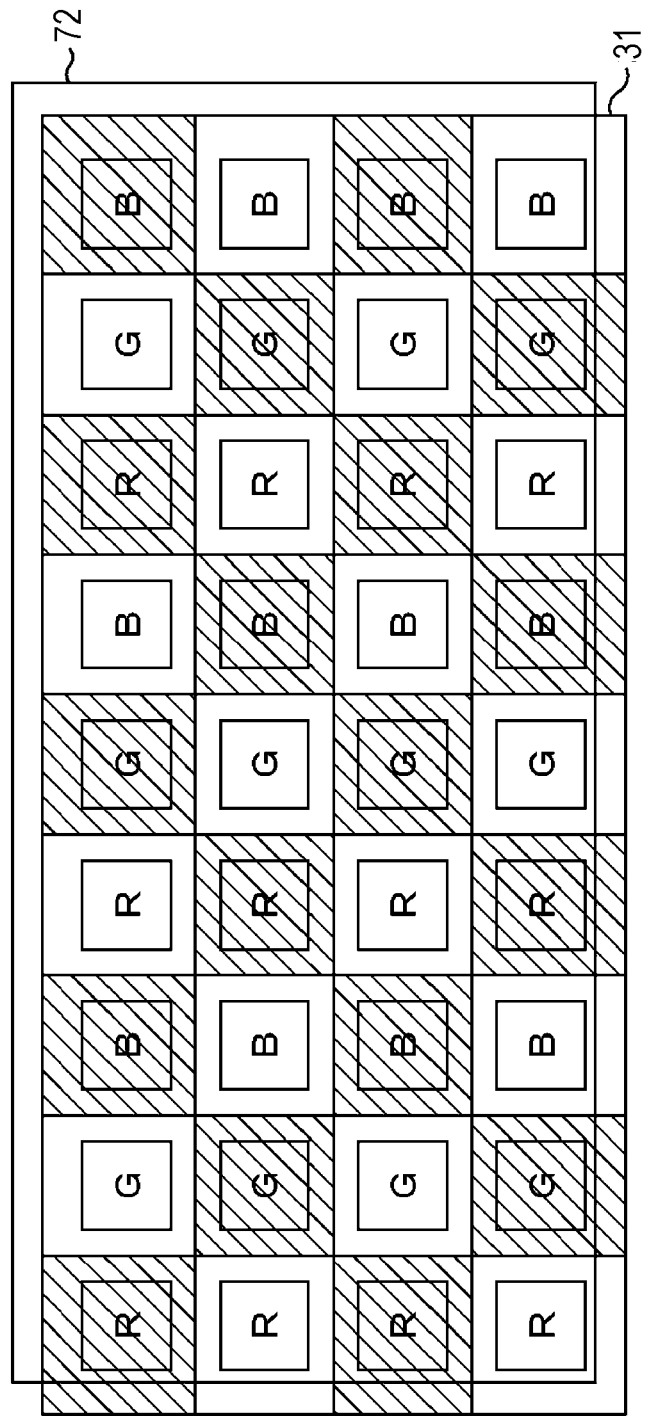
FIG. 4 is an explanatory view illustrating a step barrier.

To give another example, when the barrier element 31 employs the step barrier structure, it has rectangular opening portions and light-shielding portions arranged checkerwise, as illustrated in FIG. 4. Note that in FIG. 4, the lateral, vertical and depth directions represent the X, Y and Z directions, respectively.

In the example of FIG. 4, the barrier element 31 is provided in front of the light modulation panel 72 having R, G and B pixels, as seen in FIG. 4. Note that in FIG. 4, each square in the light modulation panel 72 represents a single pixel, and the letter "R", "G" or "B" of each pixel corresponds to the color of the emitted light, similar to the example of FIG. 3.

In the barrier element 31, each shaded portion represents a light-shielding portion, whereas each non-shaded portion represents an opening portion. Specifically, in the barrier element 31, the opening portions are arranged checkerwise in the light-shielding portion.

FIG. 4 illustrates the barrier element 31 that is viewed by the viewer's right eye. In this example, through one opening portion, a single pixel is visible to the viewer's right eye, but the adjacent pixels on the upper, lower, right and left side thereof are not visible to the viewer's right eye. In contrast, in FIG. 4, the pixels covered by the light-shielding portions are not visible to the viewer's right eye, but are visible to the left eye.

In the above step barrier structure, when the eye-point location of the viewer changes, the pixels visible to corresponding eyes of the viewer also change. Therefore, it is necessary for the barrier element 31 to move in the X, Y and Z directions in accordance with the movement of the eye-point location of the viewer.

Note that the following description will be given on the premise that the barrier element 31 moves in the X, Y and Z directions in accordance with the change in the eye-point location of the viewer. In other words, the following description will be given regarding the case where the barrier element 31 employs the step barrier structure.

(Travel Distance of Barrier Element)

In the display device 11, the barrier element 31 moves in the X, Y and Z directions in accordance with the change in the eye-point location of the viewer. The travel distance calculation section 64 calculates respective travel distances of the barrier element 31 in the X, Y and Z directions, on the basis of the current and preceding eye-point locations of the viewer.

Figure 5A:
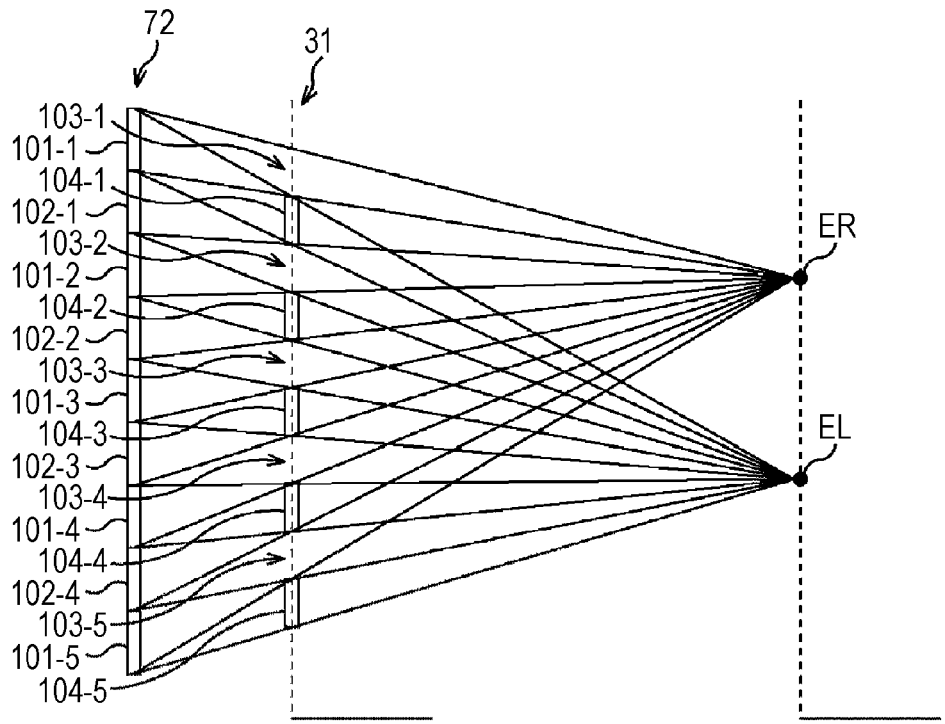
FIGS. 5A and 5B are explanatory views of a movement of a barrier element in the display device.

For example, in the light modulation panel 72, an image for a right eye is displayed in pixels 101-1 to 101-5, and an image for a left eye is displayed in pixels 102-1 to 102-4, as illustrated in FIG. 5A. The viewer observes these images for right and left eyes through the barrier element 31. Note that in FIGS. 5A and 5B, the vertical and lateral directions represent the X and Z directions, respectively.

Figure 5B:
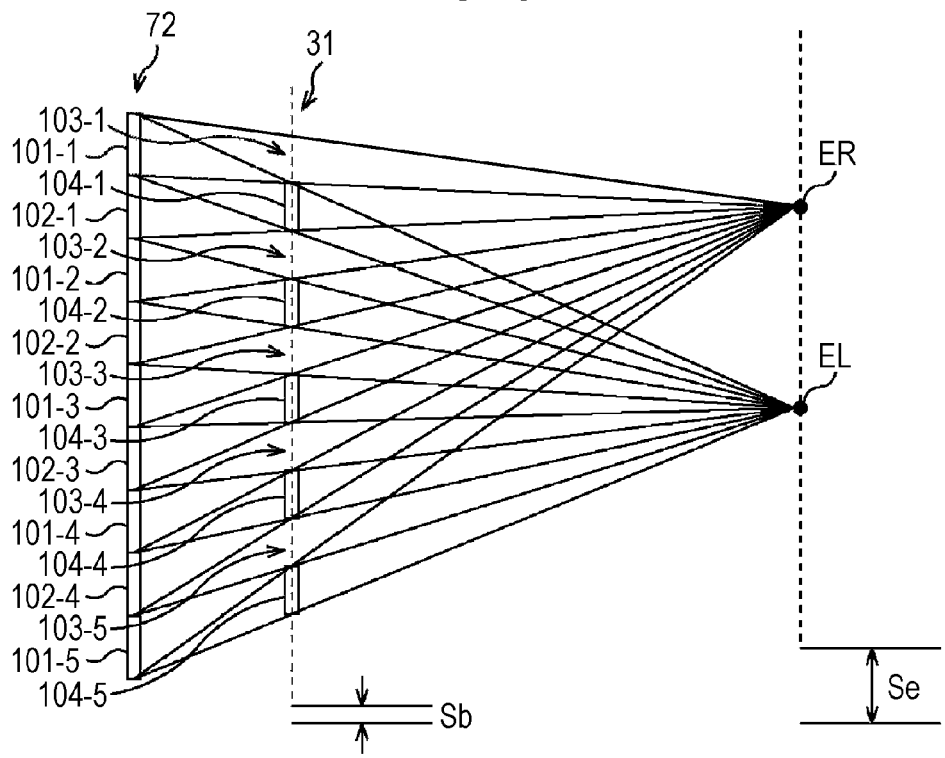

In the example of FIGS. 5A and 5B, the barrier element 31 is provided with opening portions 103-1 to 103-5 that allow light beams incident from corresponding pixels in the light modulation panel 72 to pass therethrough, and light-shielding portions 104-1 to 104-5 that block the light beams incident therefrom.

Hereinafter, each of the pixels 101-1 to 101-5 will also be called simply a "pixel 101" and each of the pixels 102-1 to 102-4 will also be called simply a "pixel 102", when it is not necessary to distinguish them individually. Likewise, hereinafter, each of the opening portions 103-1 to 103-5 will also be called simply an "opening portion 103" and each of the light-shielding portions 104-1 to 104-5 will also be called simply a "light-shielding portion 104", when it is not necessary to distinguish them individually.

In the state illustrated in FIG. 5A, light beams emitted from the pixels 101-1 to 101-5 reach a viewer's right eye ER through the opening portions 103-1 to 103-5, respectively. Meanwhile, light beams emitted from the pixels 102 are blocked by the light-shielding portions 104, thereby not reaching the viewer's right eye ER. This causes the viewer's right eye ER to observe only the image for a right eye on the pixels 101.

Likewise, light beams emitted from the pixels 102-1 to 102-4 reach a viewer's left eye EL through the opening portions 103-2 to 103-5, respectively. Meanwhile, light beams emitted from the pixels 101 are blocked by the light-shielding portions 104, thereby not reaching the viewer's left eye EL. This causes the viewer's left eye EL to observe only the image for a left eye on the pixels 102.

As illustrated in FIG. 5B, it is assumed that the eye-point location of the viewer which has been in the state of FIG. 5A moves in the X direction, more specifically, upward, as seen in FIG. 5B, by a travel distance Se. In response to this, the display device 11 moves the barrier element 31 relative to the light modulation panel 72 in the X direction, more specifically, upward, as seen in FIG. 5B, by a travel distance Sb.

In accordance with the travel distance Se that corresponds to the changing amount of the eye-point location of the viewer, the barrier element 31 moves by the travel distance Sb. This makes it possible to maintain a state where the images for right and left eyes in the pixels 101 and 102 are observed by the viewer's right and left eyes ER and EL, respectively.

Figure 6:
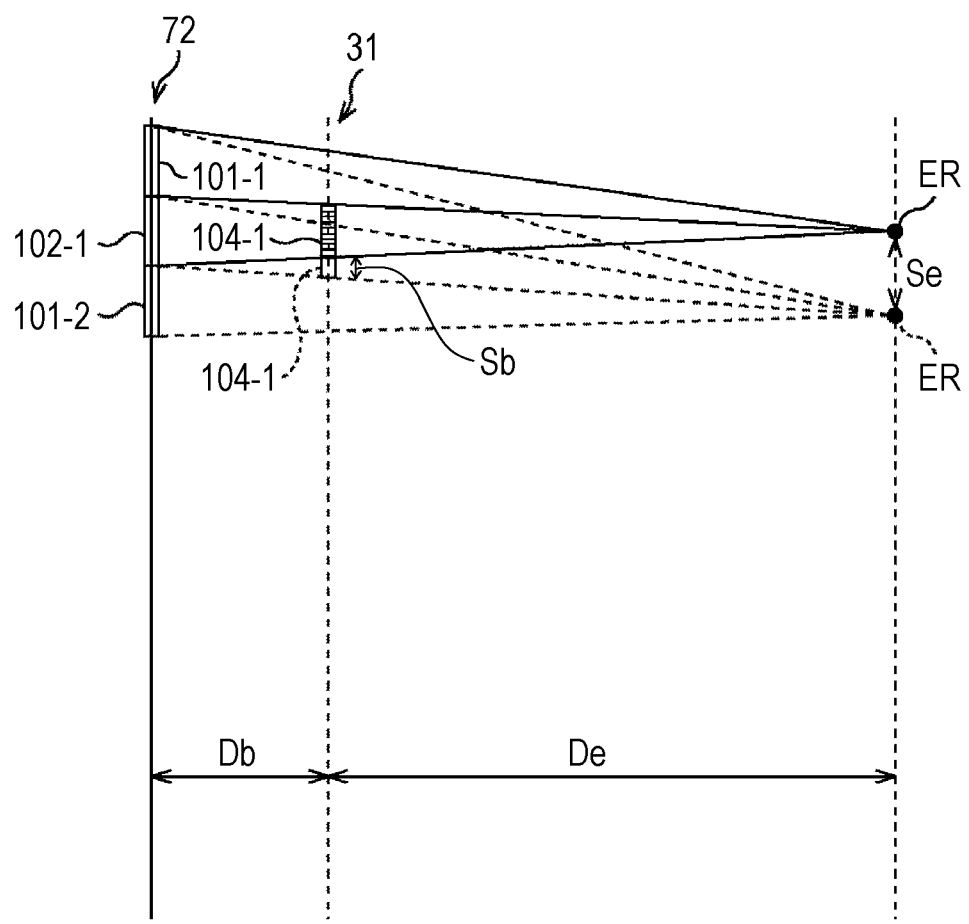
FIG. 6 is an explanatory view of the movement of the barrier element.

The travel distance Sb of the barrier element 31 which is related to the travel distance Se of the eye-point location is calculated on the basis of a Z directional distance Db between the light modulation panel 72 and the barrier element 31, and a Z directional distance De between the barrier element 31 and the eye-point location of the viewer, for example, as illustrated in FIG. 6.

In FIG. 6, the vertical and lateral directions represent the X and Z directions, respectively. In addition, in FIG. 6, components corresponding to those in FIG. 5 are given the same reference numerals, and a detailed description thereof will be omitted as appropriate.

In FIG. 6, in relation to the travel distance Se of the viewer's right eye ER, the light-shielding portion 104-1, or the barrier element 31, moves by the travel distance Sb. In this case, as is evident from the positional relationship among the light modulation panel 72, the barrier element 31, and the eye-point location of the viewer, the ratio of the travel distance Sb to the travel distance Se is equal to the ratio of the distance Db to the Z directional distance (Db+De) between the light modulation panel 72 and the eye-point location. Thus, the relationship (Sb/Se=Db/(Db+De)) is satisfied.

By transforming the above equation into an equation (1), the travel distance Sb of the barrier element 31, which is a target to be determined, is obtained.

$$Sb = \frac{Se \times Db}{(De + Db)} \quad (1)$$

The travel distance calculation section 64 determines the travel distance Se and the distance De, on the basis of the eye-point location of the viewer supplied from the eye detection section 63. Then, the travel distance calculation section 64 determines the travel distance Sb of the barrier element 31 through a calculation using the equation (1).

Likewise, the travel distance by which the barrier element 31 moves in the Y direction in relation to the movement of the eye-point location of the viewer in the Y direction is determined through the calculation using the equation (1).

However, in the case where the barrier element 31 employs the stripe barrier structure, it is not necessary for the barrier element 31 to move in the Y direction even when the eye-point location of the viewer moves in the Y direction. Meanwhile, in the case where the barrier element 31 employs either of the step and delta barrier structures, it is necessary for the barrier element 31 to move in the Y direction when the eye-point location of the viewer moves in the Y direction.

Figure 7A:
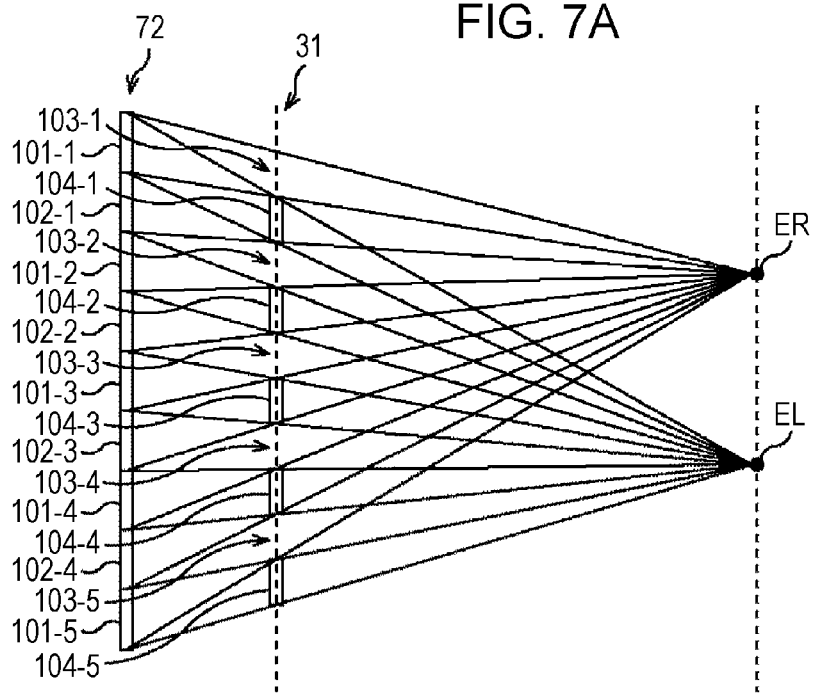
FIGS. 7A and 7B are explanatory views of the movement of the barrier element.
Figure 7B:
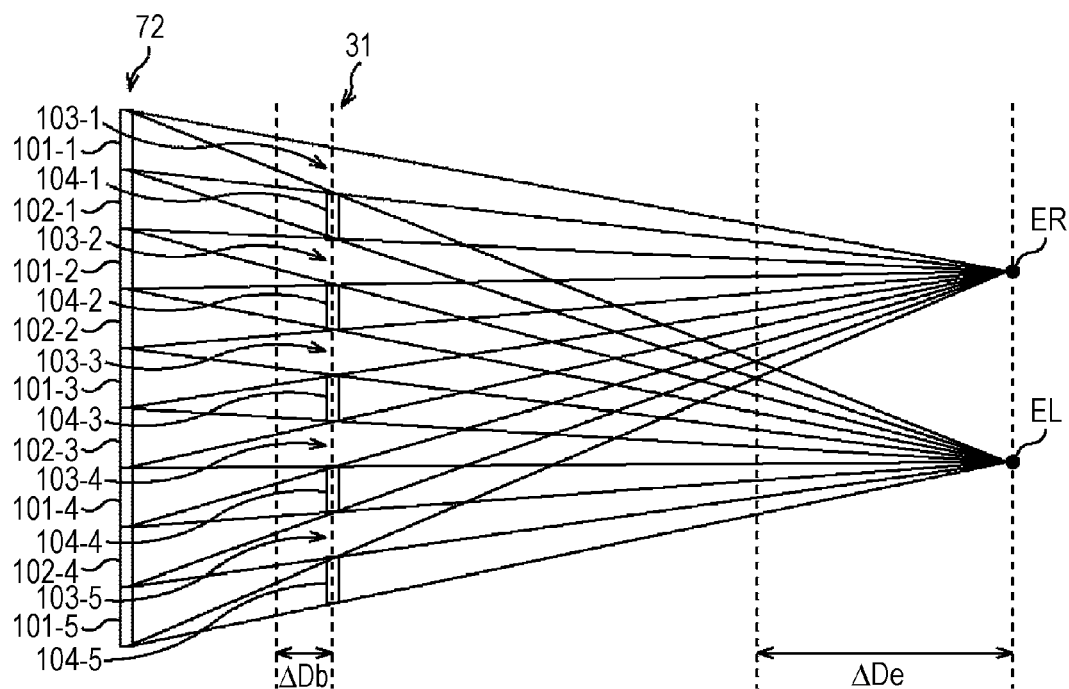

Next, it is assumed that the viewer that has been in a state of observing the image for right or left eye on the light modulation panel 72 through the opening portions 103 as illustrated in FIG. 7A moves in a direction away from the barrier element 31, for example, as illustrated in FIG. 7B.

Note that in FIGS. 7A and 7B, portions corresponding to those in FIG. 5 are given the same reference numerals, and a detailed description thereof will be omitted as appropriate. In FIGS. 7A and 7B, the vertical and lateral directions represent the X and Z directions, respectively.

In FIG. 7B, the eye-point location of the viewer that has been in a state illustrated in FIG. 7A moves in the Z direction, more specifically, in the right direction, as seen in FIG. 7B, by a travel distance ΔDe. If the barrier element 31 does not move in this case, there are cases where cross talk occurs or the luminance of the image observed decreases.

In order to allow the viewer to observe the 3D image appropriately, the display device 11 moves the overall barrier element 31 in the Z direction, more specifically, in the right direction, as seen in FIG. 7B, by a travel distance ΔDb in accordance with the travel distance ΔDe of the eye-point location of the viewer. This makes it possible to maintain the state where the images for right and left eyes in pixels 101 and 102 are observed by the right and left eyes, respectively.

Figure 8:
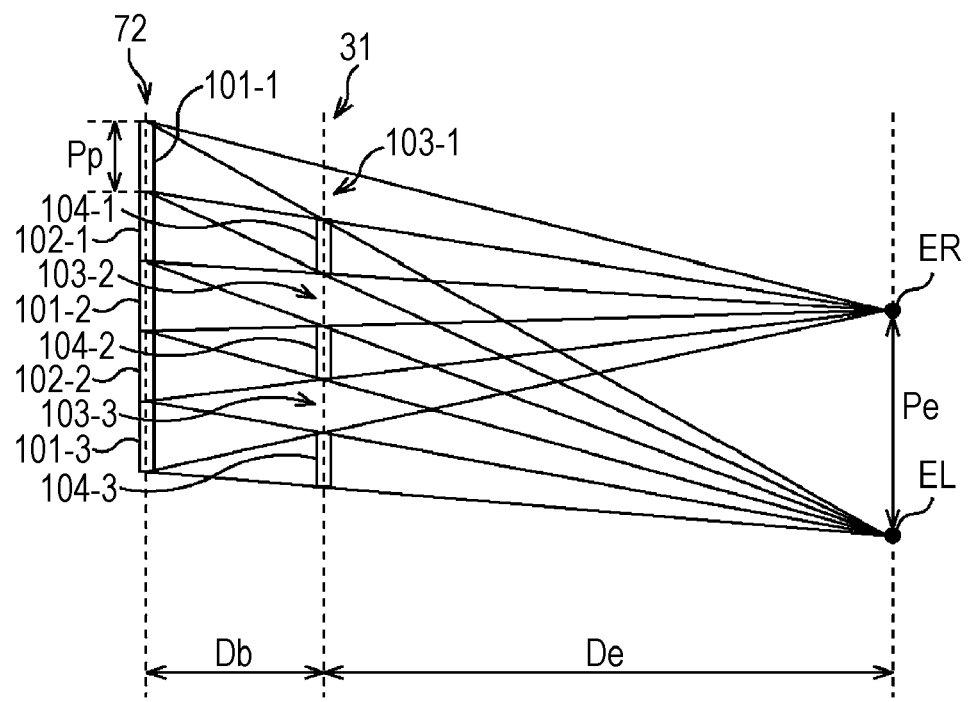
FIG. 8 is an explanatory view of the movement of the barrier element.

The travel distance of the barrier element 31 in relation to the movement of the eye-point location is calculated on the basis of a distance Pe between both eyes of the viewer and a pitch Pp between each adjacent pair of pixels in the light modulation panel 72, for example, as illustrated in FIG. 8.

In FIG. 8, the vertical and lateral directions represent the X and Z directions, respectively. Note that in FIG. 8, portions corresponding to those in FIGS. 7A and 7B are given the same reference numerals, and a detailed description thereof will be omitted as appropriate.

In FIG. 8, a distance between the viewer's right eye ER and left eye EL is denoted by Pe, and a pixel pitch that represents the length of the pixel 101 or 102 in the X direction is denoted by Pp. Here, the following equation (2) is formulated by using the positional relationship of the light modulation panel 72, the barrier element 31, and the eye-point location of the viewer, and the individual length thereof.

$$De/Db = Pe/Pp \quad (2)$$

where Db denotes a Z directional distance between the light modulation panel 72 and the barrier element 31, and De denotes a Z directional distance between the barrier element 31 and the eye-point location of the viewer. Therefore, the equation (2) indicates that the ratio of the distance De between the barrier element 31 and the eye-point location to the distance Db between the light modulation panel 72 and the barrier element 31 is equal to the ratio of the distance Pe between both eyes of the viewer and the pixel pitch Pp.

When the eye-point location of the viewer moves in the Z direction, the travel distance calculation section 64 adjusts the distance Db between the light modulation panel 72 and the barrier element 31, in accordance with the change in the distance De between the barrier element 31 and the eye-point location. This adjustment is performed on the basis of the eye-point location of the viewer supplied from the eye detection section 63, so as to satisfy the equation (2). In other words, the travel distance calculation section 64 determines a new distance Db, such that the ratio of the distance De and the distance Db becomes constant.

(Processes of Displaying 3D Image)

Next, an operation of the display device 11 will be described.

Figure 9:
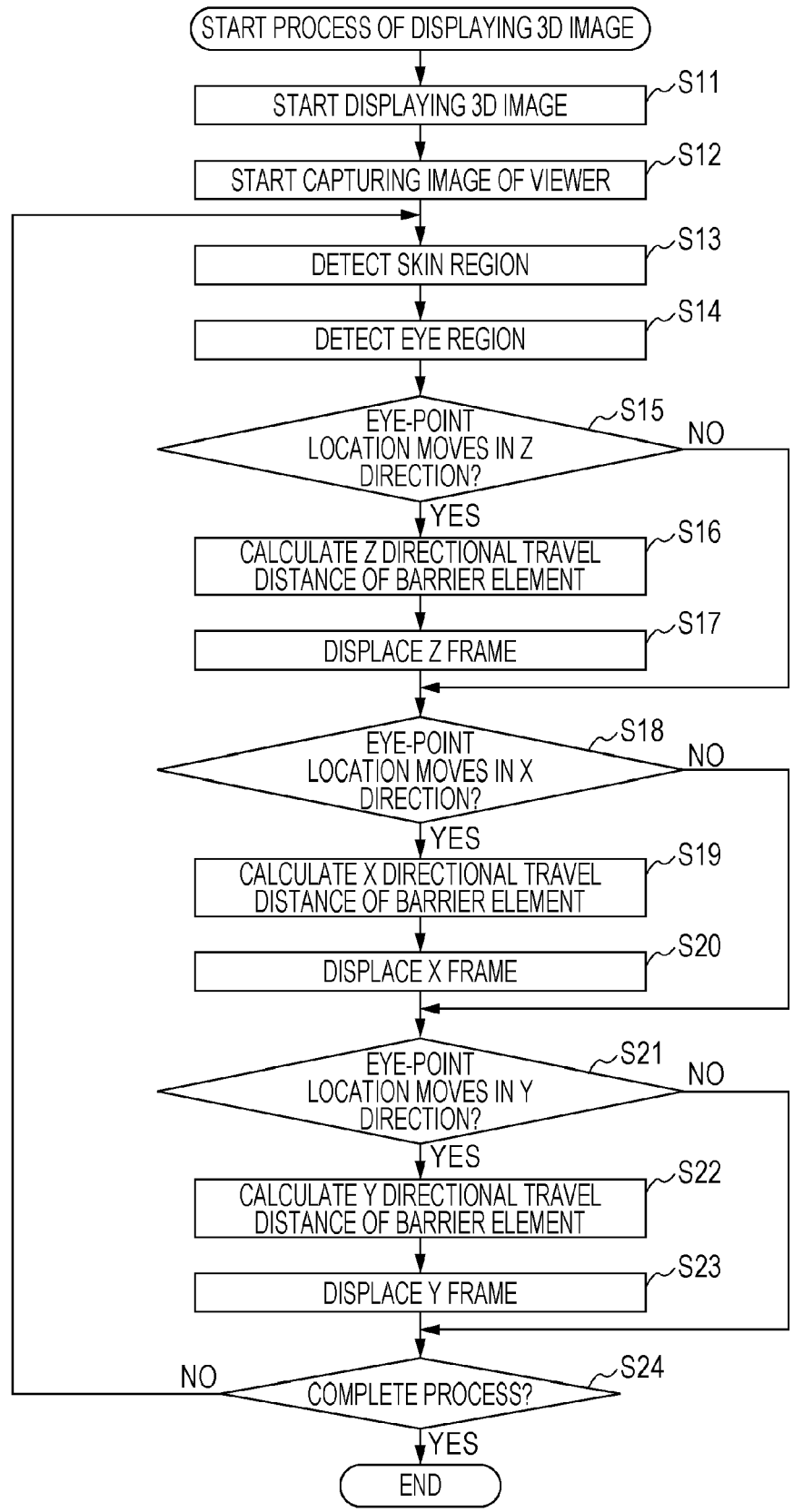
FIG. 9 is a flowchart of processes of displaying a 3D image by using the display device.

Once the viewer gives a command of reproducing a 3D image through an operation with the display device 11, the display device 11 starts processes of displaying a 3D image in response to the viewer's operation. Consequently, a 3D image is displayed on the display device 11 while the barrier element 31 is moving in accordance with the change in the eye-point location of the viewer. Hereinafter, a description will be given of processes of displaying a 3D image by using the display device 11, with reference to a flowchart in FIG. 9.

At Step S11, the display device 11 starts displaying a 3D image. In more detail, the display control section 66 acquires, from the storage section 65, images for right and left eyes composing a 3D image which is designated by the viewer. Subsequently, the display control section 66 supplies acquired images for right and left eyes to the light modulation panel 72, and causes the light modulation panel 72 to display the images. In addition, the display control section 66 controls the backlight 71.

The backlight 71 emits light under the control of the display control section 66, and the light enters the light modulation panel 72. The barrier element 31 partially blocks the light incident from the backlight 71 through the light modulation panel 72, thereby optically separating the images for right and left eyes.

As a result, the viewer observes the images for right and left eyes on the light modulation panel 72 through the barrier element 31. In other words, the viewer observes the 3D image.

At Step S12, the image pickup section 23 starts capturing an image of the viewer. In more detail, the synchronization control section 61 controls the illumination section 22 to shine illumination light on the viewer at regular intervals. In addition, the image pickup section 23 sequentially generates captured images of individual frames in synchronization with the shining the light on the viewer by the illumination section 22. The captured images are supplied to the skin region detection section 62 through the synchronization control section 61.

At Step S13, the skin region detection section 62 detects a skin region of the viewer in the captured image, on the basis of the captured image supplied from the image pickup section 23 through the synchronization control section 61. Then, the detection result is supplied to the eye detection section 63.

In the image pickup element in the image pickup section 23, for example, each pixel is provided with multiple filters having different wavelength properties, namely, different colors. Therefore, the captured image is composed of multiple images corresponding to the individual colors of the filters. In this case, for example, the wavelength property of a filter having a predetermined color is set such that a skin region in an image obtained by the filter of this predetermined color exhibits lower luminance than that by any other color. Accordingly, the skin region detection section 62 calculates a difference in luminance value between the respective images generated by the predetermined color and the other color, for each pixel. Following this, it determines a region made up of pixels, each of which has a luminance value equal to/more than a preset threshold, as a skin region.

At Step S14, the eye detection section 63 detects a region of the viewer's eyes, on the basis of the detection result of the skin region supplied from the skin region detection section 62.

For example, the eye detection section 63 may locate a region of the viewer's face in the skin region of the captured image, and then, detects a region of the viewer's eyes in the located face region. After the eye region in the captured image is determined in this manner, the eye detection section 63 calculates a location of viewer's eyes within an XYZ coordinates space (eye-point location), on the basis of the location of the eye region of the viewer, the area thereof, the distance between both eyes, and the like. The calculation result is supplied to the travel distance calculation section 64.

Specifically, for example, the viewer may input his or her eye interval (a distance between both eyes) in advance by operating the display device 11, before viewing the 3D image. Furthermore, the viewer may input the value of the eye interval directly or may select one from among multiple candidates presented by the display device 11. Alternatively, in the display device 11, a typical value may be set as an eye interval of a viewer in advance.

For example, the eye detection section 63 contains a table in advance in which with regard to an actual eye interval of the viewer (distance Pe), an eye interval of a viewer in a captured image is related to a distance (Db+De) between the light modulation panel 72 and the eye-point location when the eye interval is observed.

Once an eye interval of the viewer is inputted to the eye detection section 63 of the display device 11, the eye detection section 63 refers to the table contained therein in advance. Subsequently, the eye detection section 63 determines a distance (Db+De) between the light modulation panel 72 and the eye-point location, on the basis of the inputted eye interval of the viewer (distance Pe) and the determined eye interval of the viewer in the captured image, thereby calculating an eye-point location of the viewer. In this case, alternatively, the eye detection section 63 may determine a distance (Db+De) directly, on the basis of the inputted eye interval of the viewer (distance Pe) and the determined eye interval of the viewer in the captured image, without using the table.

Up to this point, the description has been given of the example in which the viewer inputs his or her eye interval. Alternatively, the viewer may input a distance (Db+De) between the light modulation panel 72 and the eye-point location as a viewing distance, before starting viewing the 3D image. In this case, the eye detection section 63 calculates an eye-point location of the viewer, on the basis of the inputted distance (Db+De), and the change in the eye interval of the viewer in the captured image, and the like. In addition, the travel distance calculation section 64 calculates an actual eye interval (distance Pe) of the viewer, on the basis of the inputted distance (Db+De), and the eye interval of the viewer in the captured image.

The display device 11 may be provided with a distance sensor which measures a distance (Db+De) between the light modulation panel 72 and the eye-point location. Furthermore, the display device 11 is provided with a stereo camera which captures a pair of images having a parallax therebetween, and the display device 11 may determine a distance (Db+De), on the basis of the image pair.

Moreover, for example, in the case where a distance (Db+De) is acquired through the viewer's input or the measurement of the distance sensor, and the processes are performed on premises that the eye interval of the viewer is constant, the eye detection section 63 may not detect the viewer's eyes in the captured image.

After the eye-point location of the viewer is calculated in the above manner, the processing proceeds from Step S14 to Step S15.

At Step S15, the travel distance calculation section 64 determines whether or not the eye-point location of the viewer moves in the Z direction, on the basis of the latest eye-point location of the viewer supplied from the eye detection section 63 and the past eye-point location of the viewer supplied therefrom in the previous processing. For example, if Z directional locations differ between the past and latest eye-point locations, the travel distance calculation section 64 determines that the eye-point location of the viewer has moved in the Z direction.

If it is determined that the eye-point location has moved in the Z direction at Step S15 ("YES" as Step S15), the travel distance calculation section 64 calculates a Z directional travel distance of the barrier element 31, on the basis of the eye-point locations of the viewer and the above-described equation (2), at Step S16. As a result, a travel distance $\Delta Db$, such as that in FIGS. 7A and 7B, is calculated as a Z directional travel distance of the barrier element 31. In this case, the difference between the newly calculated distance Db and the current distance Db becomes the travel distance $\Delta Db$.

After calculating the Z directional travel distance, the travel distance calculation section 64 drives the Z drive section 35 such that the barrier element 31 moves in the Z direction by the calculated Z directional travel distance.

At Step S17, the Z drive section 35 displaces the Z frame 34 under the control of the travel distance calculation section 64. This causes the barrier element 31 to move relative to the light modulation panel 72 in the Z direction by the calculated Z directional travel distance. Then, the processing proceeds to Step S18.

If it is determined that the eye-point location has not moved in the Z direction at Step S15 ("NO" as Step S15), the processing skips Step S16 and Step S17, and proceeds to Step S18.

If it is determined that the eye-point location does not move in the Z direction at Step S15 or after the Z frame 34 has been displaced at Step S17, the travel distance calculation section 64 determines whether or not the eye-point location of the viewer has moved in the X direction at Step S18.

For example, X directional locations differ between the latest eye-point location of the viewer supplied from the eye detection section 63 and the past eye-point location of the viewer supplied therefrom in the previous processing, the travel distance calculation section 64 determines that the eye-point location of the viewer has moved in the X direction.

If it is determined that the eye-point location of the viewer has moved in the X direction at Step S18 ("YES" at Step S18), the travel distance calculation section 64 calculates an X-directional travel distance by which the barrier element 31 will move in the X direction, at Step S19.

The travel distance calculation section 64 determines an X-directional travel distance Se of the eye-point location of the viewer, such as that in FIG. 6, on the basis of the current and past eye-point locations of the viewer. In addition, the travel distance calculation section 64 calculates an X-directional travel distance of the barrier element 31 through the calculation using the above-described equation (1). As a result, the travel distance Sb, such as that in FIG. 6, is calculated as an X-directional travel distance of the barrier element 31.

After calculating the X-directional travel distance, the travel distance calculation section 64 drives the X drive section 39 such that the barrier element 31 moves in the X direction by the calculated X-directional travel distance.

At Step S20, the X drive section 39 displaces the X frame 32 under the control of the travel distance calculation section 64. This causes the barrier element 31 to move relative to the light modulation panel 72 in the X direction by the calculated X-directional travel distance. The processing proceeds to Step S21.

If it is determined that the eye-point location does not move in the X direction at Step S18 ("NO" as Step S18), the processing skips Step S19 and Step S20, and proceeds to Step S21.

If it is determined that the eye-point location has not moved in the X direction at Step S18 or after the X frame 32 has been displaced at Step S20, the travel distance calculation section 64 determines whether or not the eye-point location of the viewer has moved in the Y direction at Step S21.

For example, if Y directional locations differ between the latest eye-point location of the viewer supplied from the eye detection section 63 and the past eye-point location of the viewer supplied therefrom in the previous processing, the travel distance calculation section 64 determines that the eye-point location of the viewer has moved in the Y direction.

If it is determined that the eye-point location of the viewer has moved in the Y direction at Step S21, the travel distance calculation section 64 calculates a Y-directional travel distance by which the barrier element 31 will move in the Y direction, at Step S22. For example, the travel distance calculation section 64 performs a process similar to that of Step S19 on the basis of the current and past eye-point locations of the viewer, thereby calculating a Y directional travel distance of the barrier element 31.

After calculating the Y-directional travel distance, the travel distance calculation section 64 drives the Y drive section 37 such that the barrier element 31 moves in the Y direction by the calculated Y-directional travel distance.

At Step S23, the Y drive section 37 displaces the Y frame 33 under the control of the travel distance calculation section 64. This causes the barrier element 31 to move relative to the light modulation panel 72 in the Y direction by the calculated Y directional travel distance. The processing proceeds to Step S24.

If it is determined that the eye-point location has not moved in the Y direction at Step S21 ("NO" at Step S21), the processing skips Step S22 and Step S23, and proceeds to Step S24.

At Step S24, the display device 11 determines whether to complete the processing. For example, when the viewer gives an instruction of terminating the reproduction of the 3D image through the operation with the display device 11, the display device 11 determines the completion of the processing.

If it is determined that the processing is not completed at Step S24, the processing returns to Step S13, and the above processes will be repeated.

Otherwise, if it is determined that the processing is completed at Step S24, the display device 11 shuts down the processes performed by the individual components to thereby complete the processing of displaying the 3D image.

As described above, once the display of a 3D image starts, the display device 11 detects the eye-point location of the viewer, and physically moves the barrier element 31 to an optimal location in accordance with the movement of the eye-point location. Accordingly, the barrier element 31 continuously moves. This suppresses the variation in the luminance of the 3D image and the generation of the crosstalk, thus making it possible to provide a high-quality 3D image, regardless of barrier structure and independently of the eye-point location of the viewer.

The above description has been given regarding the case where the eye region of the viewer is detected in the captured image, and then, the viewer's eye-point in the eye region is located. Alternatively, on the basis of the location of the viewer's face detected in the captured image, the travel distances of the barrier element 31 in the respective directions may be calculated. In this case, the travel distances of the barrier element 31 are calculated on the basis of the change in the location of the viewer's face. In the case of calculating the travel distances of the barrier element 31 using the change in the location of the viewer's face, the travel distances of the barrier element 31 are calculated less precisely than that using the change in the eye location. However, this makes it possible to calculate the travel distances of the barrier element 31 more promptly with simpler calculations.

Modification Example 1

Exemplary Configuration of Appearance of Display Device

In the above description, an ultrasound actuator has been given by an example of each of the X drive section 39, the Y drive section 37, and the Z drive section 35. However, each drive section that is configured to move the barrier element 31 may be a bimorph element or any other suitable unit.

Figure 10:
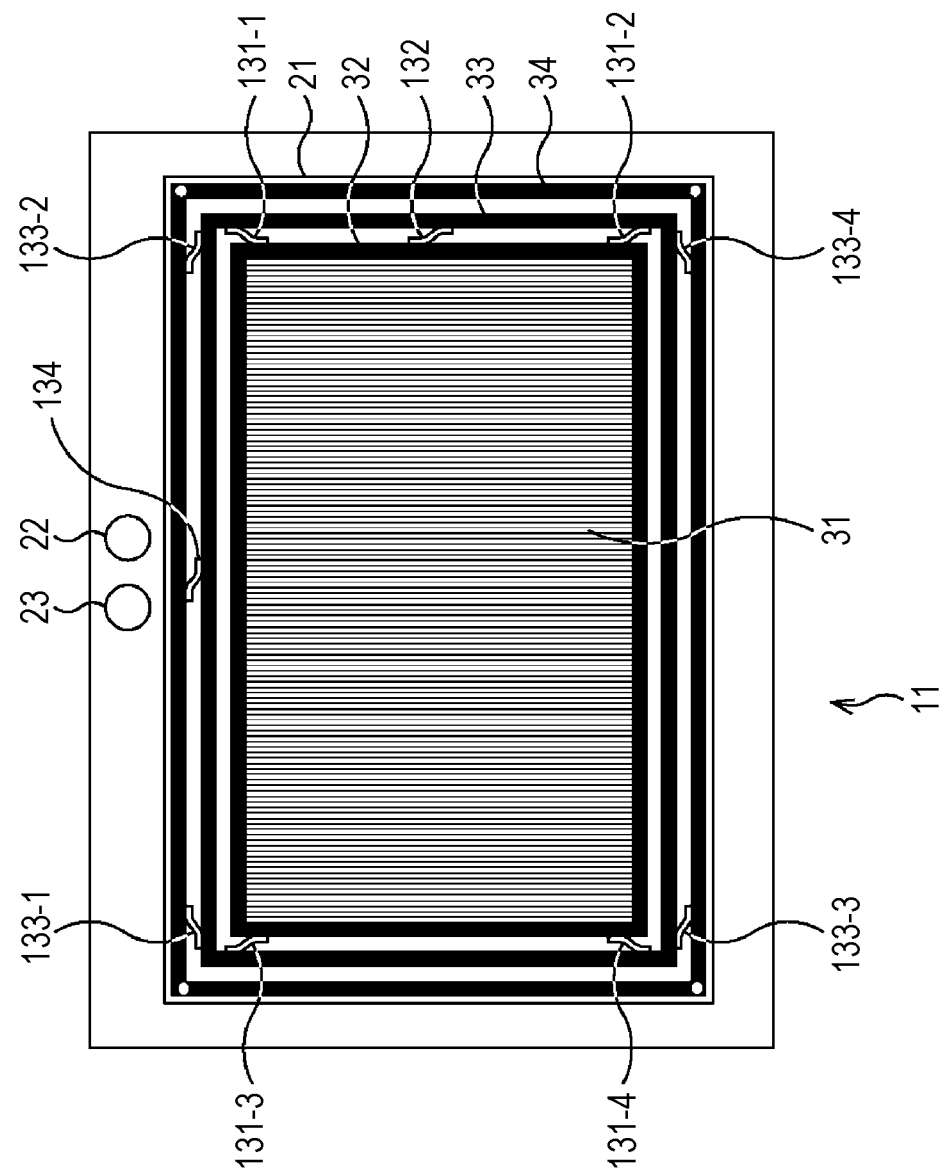
FIG. 10 is a view illustrating an exemplary configuration of an appearance of a modification example of the display device according to the first embodiment of the present technology.

For example, it is assumed that bimorph elements are used to physically move the barrier element 31, respective bimorph elements may be provided between the Z frame 34 and the housing of the display device 11, between the Y frame 33 and the Z frame 34, and between the X frame 32 and the Y frame 33, as illustrated in FIG. 10.

Note that in FIG. 10, the lateral, vertical and depth directions represent the X, Y and Z directions, respectively. In addition, in FIG. 10, portions corresponding to those in FIG. 1 are given the same reference numerals, and a detailed description thereof will be omitted as appropriate.

In the example of FIG. 10, the X frame 32 is fixed to the inner side of the Y frame 33 through plate springs 131-1 to 131-4 provided on the right and left inner sides, as seen in FIG. 10, of the Y frame 33. Thus, with the plate springs 131-1 to 131-4, the X frame 32 is kept being pressed inward from the Y frame 33, so that the X frame 32 is fixed to the Y frame 33. Note that each of the plate springs 131-1 to 131-4 will also be called simply a "plate spring 131" hereinafter when it is not necessary to distinguish them individually.

A bimorph element 132 is provided between the X frame 32 and the Y frame 33, and this bimorph element 132 displaces the X frame 32 relative to the Y frame 33 in the X direction, thereby moving the barrier element 31 in the X direction.

The Y frame 33 is fixed to the inner side of the Z frame 34 through plate springs 133-1 to 133-4 provided on the upper and lower inner sides, as seen in FIG. 10, of the Z frame 34. Thus, with the plate springs 133-1 to 133-4, the Y frame 33 is kept being pressed inward from the Z frame 34, so that the Y frame 33 is fixed to the Z frame 34. Note that each of the plate springs 133-1 to 133-4 will also be called simply a "plate spring 133" hereinafter when it is not necessary to distinguish them individually.

A bimorph element 134 is provided between the Z frame 34 and the Y frame 33, and this bimorph element 134 displaces the Y frame 33 relative to the Z frame 34 in the Y direction, thereby moving the barrier element 31 in the Y direction.

The Z frame 34 is connected to the housing of the display device 11 through plate springs (not illustrated) provided at four corners thereof. This Z frame 34 is movable relative to the housing of the display device 11 in the Z direction by a bimorph element (not illustrated) between the Z frame 34 and the housing of the display device 11.

In the case where the display device 11 has the configuration illustrated in FIG. 10, a functional configuration of the display device 11, such as that illustrated in FIG. 2, includes the bimorph element 132, the bimorph element 134, and the non-illustrated bimorph element, instead of the X drive section 39, the Y drive section 37, and the Z drive section 35. The bimorph element 132 and the like are configured to be driven in accordance with voltage signals indicating the travel distance of the eye-point location which is supplied from the travel distance calculation section 64.

The above description has been given regarding the case where a separation section, such as the barrier element 31, is disposed between the light modulation panel 72 and the viewer's eyes. Alternatively, the display device may also employ a configuration in which a point light source array is disposed on the back surface of the light modulation panel 72. In this case, by moving the point light source array, it is possible for the display device with the above configuration to produce the same effect as the display device 11 according to the above embodiment does.

The above series of processes may be implemented by either of hardware or software. In the case where the series of processes is performed by using software, a program constituting the software which is stored in a program recording medium may be installed in, for example, a computer with dedicate built-in hardware, or a general-purpose computer that is capable of carrying out various functions by installing various programs therein.

FIG. 11 is a block diagram of an exemplary configuration of hardware in a computer that sequentially performs the above series of processes.

In the computer, a central processing unit (CPU) 301, a read only memory (ROM) 302, and a random access memory (RAM) 303 are interconnected to one another through a bus 304.

The bus 304 is connected to an I/O interface 305. The I/O interface 305 is connected to an input unit 306 including a keyboard, a mouth and a microphone, an output unit 307 including a display and a speaker, a storage section 308 including a hard disk and a nonvolatile memory, a communication unit 309 including a network interface, and a drive 310 driving a removable medium 311 including a magnetic disk, an optical disc, a magneto-optical disk, and a semiconductor memory. In this case, the output unit 307 corresponds to the display section 21 of FIG. 1.

In the computer having the above configuration, for example, the CPU 301 loads a program stored in the storage section 308 into the RAM 303 through the I/O interface 305 and the bus 304, and then, executes the program, so that the series of processes are performed.

The program to be executed by the computer (CPU 301) is provided in a form of the removable medium 311 that is a package medium or through a wired or wireless transmission medium. An example of the removable medium 311 is a magnetic disk (including a flexible disk), an optical disc (including a compact disc-read only memory (CD-ROM), a digital versatile disc (DVD), and a semiconductor memory), a magneto-optical disk, a semiconductor memory, and the like. An example of the wired or wireless transmission medium is a local area network, the Internet, a digital satellite broadcast, and the like.

The program may be installed in the storage section 308 through the I/O interface 305 by placing the removable medium 311 in the drive 310. Alternatively, the program may be received by the communication unit 309 through the wired or wireless transmission medium, and installed in the storage section 308, or may be installed in the ROM 302 or the storage section 308 in advance.

Note that the program to be executed in the computer may cause the computer to perform the processes not only sequentially in the order described above, but also in parallel or at proper timing, such as at the time when the program is called.

Note that an embodiment of the present technology is not limited to the above embodiments, and various modifications thereof are possible without departing from the scope or spirit of the present technology.

Note that the present technology may also include the following configuration.

[1] A display device including:
a display section displaying a plurality of images intended for different eye-points;
a separation section optically separating the plurality of images intended for the different eye-points;
a travel distance calculation section calculating a plurality of directional travel distances of the separation section relative to the display section, in accordance with a change in an eye-point location of a viewer observing the display section; and
a plurality of drive sections being driven on the basis of the directional travel distances and moving the separation section relative to the display section.

[2] The display device according to [1], wherein the drive sections move the separation section in a direction perpendicular to a display surface of the display section.

[3] The display device according to [2], wherein the travel distance calculation section calculates a travel distance of the separation section in the direction perpendicular to the display surface, on the basis of a distance between the separation section and the viewer's eye-point location, a viewer's eye interval, and a pitch between each adjacent pair of pixels provided in the display section.

[4] The display device according to one of [1] to [3], wherein the drive sections move the separation section in a plurality of directions parallel to the display surface of the display section.

[5] The display device according to [4], wherein the travel distance calculation section calculates a plurality of travel distances of the separation section in respective directions parallel to the display surface, on the basis of changing amounts of the viewer's eye-point location in the directions parallel to the display surface, a distance between the separation section and the display section, and a distance between the separation section and the viewer's eye-point location.

[6] The display device according to one of [1] to [5], further including:
  a first holding member holding the separation section; and
  a second holding member holding the first holding member,
  wherein the drive section is provided between the first holding member and the second holding member, and moves the separation section by displacing the first holding member relative to the second holding member.

The present disclosure contains subject matter related to that disclosed in Japanese Priority Patent Application JP 2011-267558 filed in the Japan Patent Office on Dec. 7, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
  a display section displaying a plurality of images intended for different eye-points;
  a separation section optically separating the plurality of images intended for the different eye-points;
  a travel distance calculation section calculating a plurality of directional travel distances of the separation section relative to the display section, in accordance with a change in an eye-point location of a viewer observing the display section; and
  a plurality of drive sections being driven on the basis of the directional travel distances and moving the separation section relative to the display section;
  wherein the drive sections move the separation section in a direction perpendicular to a display surface of the display section; and
  wherein the travel distance calculation section calculates a travel distance of the separation section in the direction perpendicular to the display surface;
  wherein the travel distance calculation section calculates a travel distance of the separation section, on the basis of a distance between the separation section and the viewer's eye-point location, a viewer's eye interval, and a pitch between each adjacent pair of pixels provided in the display section.

2. The display device according to claim 1, wherein the drive sections move the separation section in a plurality of directions parallel to the display surface of the display section.

3. The display device according to claim 2, wherein the travel distance calculation section calculates a plurality of travel distances of the separation section in respective directions parallel to the display surface, on the basis of changing amounts of the viewer's eye-point location in the directions parallel to the display surface, a distance between the separation section and the display section, and a distance between the separation section and the viewer's eye-point location.

4. The display device according to claim 3, further comprising:
  a first holding member holding the separation section; and
  a second holding member holding the first holding member,
  wherein the drive section is provided between the first holding member and the second holding member, and moves the separation section by displacing the first holding member relative to the second holding member.

5. A display method performed by a display device including a display section which displays a plurality of images intended for different eye-points; a separation section which optically separates the images intended for the different eye-points; and a drive section which moves the separation section relative to the display section in a plurality of directions, the display method comprising:
  calculating a plurality of directional travel distances of the separation section in a direction perpendicular to the display section, in accordance with a change in an eye-point location of a viewer observing the display section, wherein the calculating is performed on the basis of a distance between the separation section and the viewer's eye-point location, a viewer's eye interval, and a pitch between each adjacent pair of pixels provided in the display section; and
  moving the separation section in the direction perpendicular to the display section by driving the drive section on the basis of the directional travel distances.

6. A display process performed by a computer controlling a display device, the display device including a display section which displays a plurality of images intended for different eye-points; a separation section which optically separates the images intended for the different eye-points; and a drive section which moves the separation section relative to the display section in a plurality of directions, the display process comprising:
  calculating a plurality of directional travel distances of the separation section in a direction perpendicular to the display section, in accordance with a change in an eye-point location of a viewer observing the display section, wherein the calculating is performed on the basis of a distance between the separation section and the viewer's eye-point location, a viewer's eye interval, and a pitch between each adjacent pair of pixels provided in the display section; and
  moving the separation section in the direction perpendicular to the display section by driving the drive section on the basis of the directional travel distances.

* * * * *